(12) United States Patent
Duthel (10) Patent No.: US 9,712,247 B2
(45) Date of Patent: Jul. 18, 2017

(54) LOW BIT RATE SIGNALING WITH OPTICAL IQ MODULATORS

(71) Applicant: Cisco Technology, Inc., San Jose, CA (US)

(72) Inventor: Thomas Duthel, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 14/084,746

(22) Filed: Nov. 20, 2013

(65) Prior Publication Data

US 2015/0139665 A1 May 21, 2015

(51) Int. Cl.
*H04B 10/516* (2013.01)
*H04B 10/50* (2013.01)

(52) U.S. Cl.
CPC ....... *H04B 10/516* (2013.01); *H04B 10/5053* (2013.01)

(58) Field of Classification Search
CPC ............................ H04B 10/5053; H04B 10/516
See application file for complete search history.

(56) References Cited

U.S. PATENT DOCUMENTS

| | | | |
|---|---|---|---|
| 5,008,957 A * | 4/1991 | Kiyono | H04B 10/505 398/186 |
| 6,856,441 B2 | 2/2005 | Zhang et al. | |
| 7,272,271 B2 | 9/2007 | Kaplan et al. | |
| 8,050,351 B2 | 11/2011 | Cho et al. | |
| 2004/0021829 A1 | 2/2004 | Griffin | |
| 2009/0196602 A1 * | 8/2009 | Saunders | H04B 10/5053 398/26 |
| 2015/0117869 A1 * | 4/2015 | Wakayama | H04B 10/5053 398/185 |

* cited by examiner

*Primary Examiner* — Shi K Li
*Assistant Examiner* — Mina Shalaby
(74) *Attorney, Agent, or Firm* — Patterson + Sheridan, LLP (57) ABSTRACT

In one embodiment, a method includes receiving an optical input signal to be modulated by an IQ modulator. The method includes applying data to first and second modulators during a first operation, and applying a first pattern of data to the first modulator and a second pattern of data to the second modulator during a second operation. The second operation results in an optical output signal of the IQ modulator having a low power output and a high power output. The first and second patterns are defined to provide respective desired average powers for a predefined time period based on the low and high power outputs. In another embodiment, a method includes indentifying a transmitter in an optical system by low bit rate signaling. Low bit rate signaling includes receiving an optical input signal from an optical source and transmitting identification data of the transmitter.

20 Claims, 6 Drawing Sheets

LOW BIT RATE SIGNALING WITH OPTICAL IQ MODULATORS

TECHNICAL FIELD

Embodiments presented in this disclosure generally relate to low bit rate signaling with optical IQ modulators, and more specifically, to controlling the average output power of a signal using patterns for low bit rate signaling.

BACKGROUND

During the installation of new network equipment, several hundreds of transmitters are taken into operation by connecting the transmitters to multiplex devices. Multiplex devices have several tens of input fibers, therefore, making it easy to erroneously connect the wrong transmitter to the wrong input. Low bit rate signaling allows a transmitter to send a known on-off keying sequence, and thereby identify the optical port to which the transmitter is connected. While there are a variety of options for allowing the transmitter to identify itself by implementing low bit rate signals, most have undesirable drawbacks and limitations.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment of the present disclosure includes a method that includes receiving an optical input signal to be modulated by an IQ modulator. The method also includes applying data to first and second modulators during a first operation. The method also includes applying a first pattern of data to the first modulator and a second pattern of data to the second modulator during a second operation. The second operation results in an optical output signal of the IQ modulator having a low power output and a high power output. The first and second patterns are defined to provide a desired average power for a predefined time period based on the low and high power outputs.

Another embodiment of the present disclosure includes an optical modulation system that includes a first modulator in a first optical path and a second modulator in a second optical path where an optical input signal is divided between the first and second optical path. The system also includes a controller configured to apply data to the first and second modulators during a first operation and to apply a first pattern of data to the first modulator and apply a second pattern of data to the second modulator during a second operation. The second operation results in an optical output signal of the of the optical modulation system having a low power output and a high power output and the first and second patterns of data are defined to provide respective desired average powers for a predefined time period based on the low and high power outputs.

Another embodiment of the present disclosure includes a method including indentifying a transmitter in an optical system by low bit rate signaling. The low bit rate signaling includes receiving an optical input signal from an optical source and transmitting identification data of the transmitter. The identification data is encoded in one or more averages of low and high power values generated by an on-off keying sequence outputted from an optical IQ modulator.

Example Embodiments

Low bit rate signaling supports installation of new network equipment by configuring each optical transmitter to send a known on-off sequence, which allows identification of an optical port to which the transmitter is connected.

Figures 1, 2:
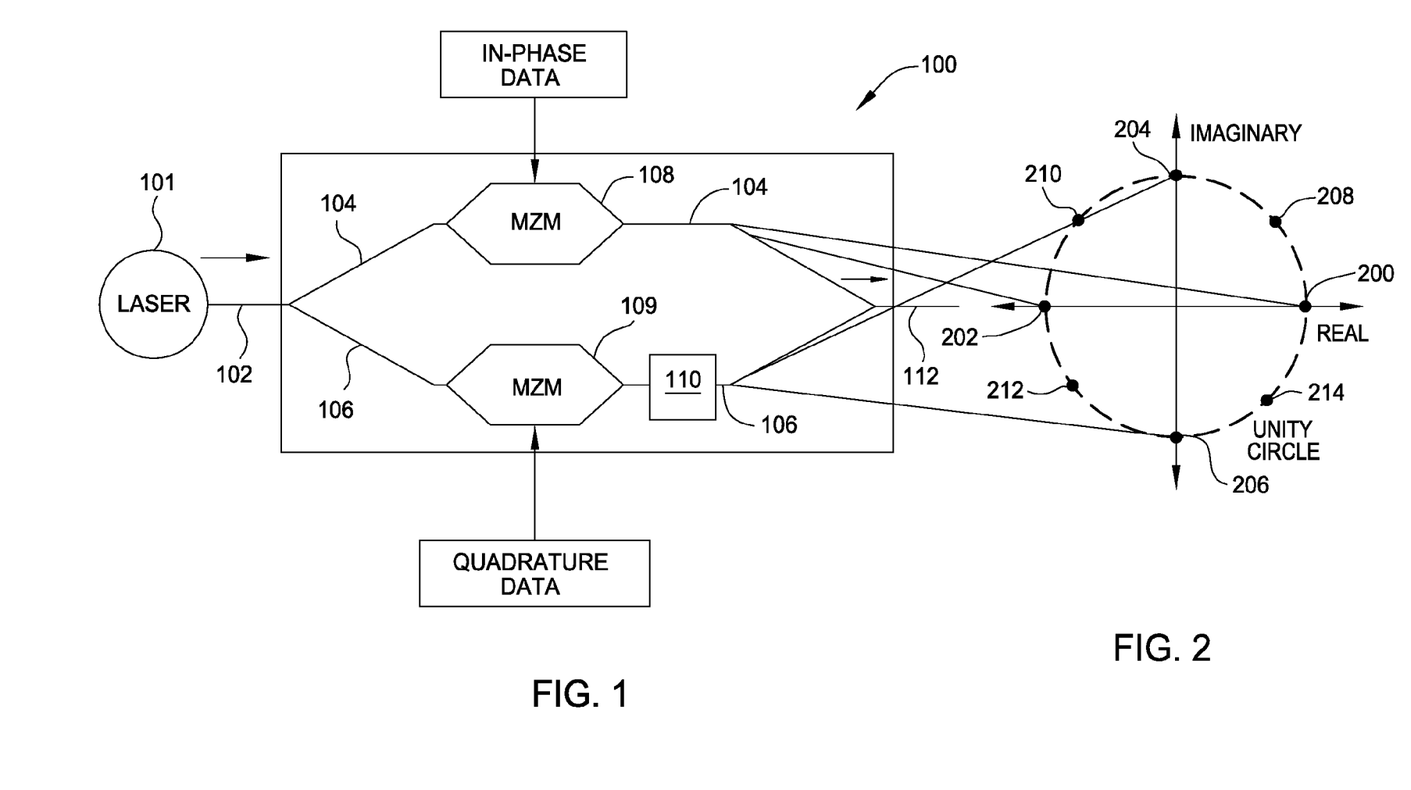
FIG. 1 illustrates a block diagram of an IQ modulator configured for normal operation, according to one embodiment disclosed herein.
FIG. 2 illustrates a constellation diagram of in-phase/quadrature data interference from the IQ modulator of FIG. 1, according to one embodiment disclosed herein.

FIG. 1 illustrates a block diagram of an IQ modulator 100 during normal operation. The IQ modulator 100 includes an optical input 102, an in-phase branch 104, a quadrature branch 106, nested Mach-Zehnder modulators (MZM) 108, 109, an optional phase shifter 110, and an optical output 112 of the IQ modulator 100. A laser 101 issues a continuous wave as the optical input 102, and the nested MZMs 108, 109 modulate the optical input 102 to generate the optical output 112. In one embodiment, the optical output 112 is a quadrature phase-shift keying (QPSK) signal. However, it is contemplated that the IQ modulator 100 is suitable for other modulation schemes during normal operation, e.g., binary phase-shift keying (BPSK), on-off keying (OOK), 16 quadrature amplitude modulation (QAM) or 64QAM.

The in-phase branch 104 includes the in-phase MZM 108 driven by a driver unit at a first voltage (not shown). The quadrature branch 106 includes the quadrature MZM 109, driven at a second voltage, and the phase shifter 110. In one embodiment, the nested MZMs 108, 109 are fabricated from a material including lithium niobate ($LiNbO_3$), indium phosphide (InP), indium gallium arsenide (InGaAs), silicon (Si), a polymer, or any combinations and/or derivatives thereof. The phase shifter 110 is configurable to shift the phase of an optical signal at any appropriate phase shift, such as 0 degrees, 90 degrees or 180 degrees. The in-phase branch 104 and the quadrature branch 106 are coupled at their output ends to form the optical output 112 of the IQ modulator 100.

FIG. 2 illustrates a constellation diagram of in-phase/ quadrature data interference from the IQ modulator of FIG. 1 when using QPSK modulation. The real axis and imaginary axis represent a complex plane. Referring to FIGS. 1 and 2, in one embodiment, the in-phase data is applied to the in-phase MZM 108 which selectively phase shifts the optical signal in the in-phase branch 104 between 0 and 180 degrees. For example, a logical zero applied to the MZM 108 shifts the optical signal by 180 degrees as shown by point 202 on the real axis, while a logical one does not apply any phase shift as shown by point 200 on the real axis. Similarly, quadrature data is applied to the quadrature MZM 109 to selectively phase shift the optical signal in the quadrature branch 106 from 0 and 180 degrees. Like MZM 108, a logical zero may cause the MZM 109 to apply a 180 degree phase shift, while a logical one does not change the phase. Moreover, the quadrature branch 106 includes the phase shifter 110 that applies a 90 degree phase shift to the optical signal. As such, the output of the 180 degree phase shift from the MZM 109 and the 90 degree phase shift from the phase shifter 110, results in a 270 degree phase shift at the quadrature branch 106, shown as a point 206. If MZM 109 does not phase shift the optical signal, the phase shifter 110 still applies the 90 degree phase shift which is shown as point 204.

The respective outputs at the in-phase branch 104 and the quadrature branch 106 are then combined at the optical output 112 to form the output optical signal for the modulator 100. This means the phases of the respective optical signals are combined to result in a single phase shift of the output signal. For example, the combined instantaneous optical output 112 of the point 202 (representing a 180 degree phase shift at the in-phase branch 104) and the point 206 (representing a 270 degree phase shift at the quadrature branch 106) is a 225 degree phase shift of the optical input 102 signal, shown as point 212. In one embodiment, a symbol representing two bits (e.g., 00, 01, 10, and 11) is coded in the phase of the resulting optical output 112 signal, e.g., point 212. For example, a receiver detecting the point 212 would decode the point 212 at 225 degrees to be a symbol with bits 00. As shown in TABLE 1 below, points 208, 210, 212 and 214 represent the combined instantaneous optical output 112 signal resulting from the combination of the outputs at the in-phase branch 104 and the quadrature branch 106 at points 200, 202, 204, and 206. The points 208, 210, 212, and 214 each represent symbols having two bits encoded therewithin, e.g., point 214 at 315 degrees is a symbol representing bits 10.

TABLE 1

| In-phase bit | Quadrature bit | Combined Instantaneous Optical Output |
| --- | --- | --- |
| 1 | 1 | 45° |
| 0 | 1 | 135° |
| 0 | 0 | 225° |
| 1 | 0 | 315° |

Figures 3, 4:
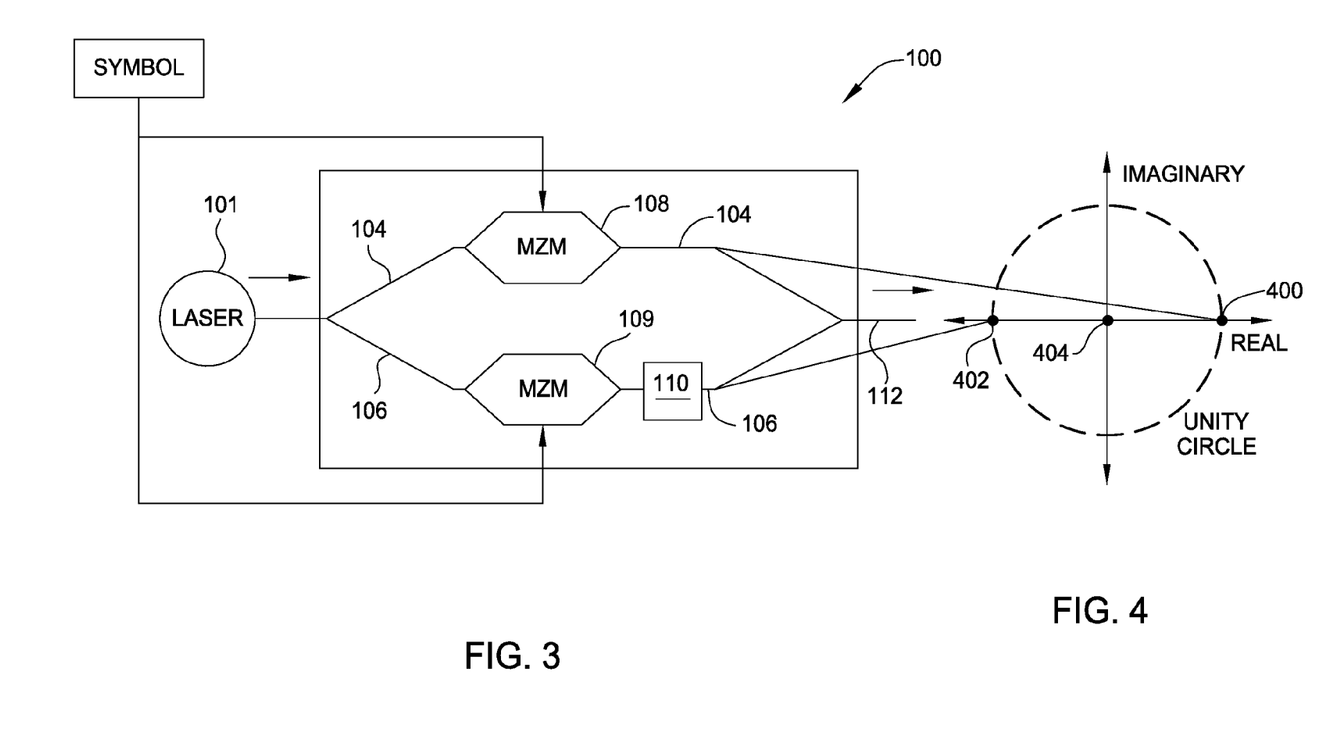
FIG. 3 illustrates a block diagram of an IQ modulator configured for low bit rate signaling, according to one embodiment disclosed herein.
FIG. 4 illustrates a constellation diagram of in-phase/quadrature data interference from the IQ modulator of FIG. 3, according to one embodiment disclosed herein.

FIG. 3 illustrates a block diagram of the IQ modulator 100 during a low bit rate signaling operation, where the phase shifter 110 is configured to shift the phase of the optical signal outputted from the quadrature MZM 109 at the quadrature branch 106 by 180 degrees rather than by 90 degrees during the normal operation as shown by FIG. 1. FIG. 4 illustrates a constellation diagram of in-phase/ quadrature data interference from the IQ modulator of FIG. 3. Referring to FIGS. 3 and 4, in one embodiment, during a low bit rate signaling operation the same data signal is applied to both the in-phase MZM 108 and the quadrature MZM 109 such that no phase shift is applied to the optical signals in the respective branches 104 and 106. Thus, the optical signal at the in-phase branch 104 has a 0 degree phase shift as shown as point 400 on the real axis. However, at the quadrature branch 106, the phase shifter 110 is configured to apply a 180 degree phase shift to the quadrature data, resulting in point 402. Thus, when the same data symbol (e.g., either a logical one or a logical zero) is applied to both MZMs 108, 109, the optical signals in the branches will be 180 degrees out of phase. Therefore, at the combined instantaneous optical output 112, the individual outputs at the in-phase branch 104 and the quadrature branch 106 destructively interfere to yield an output point 404. That is, the resulting symbol 404 indicates a destructive interference of the first and second points 400, 402 and reflects a low output power. In one embodiment, the term "low" could also mean zero, representing no output power.

Figures 5, 6:
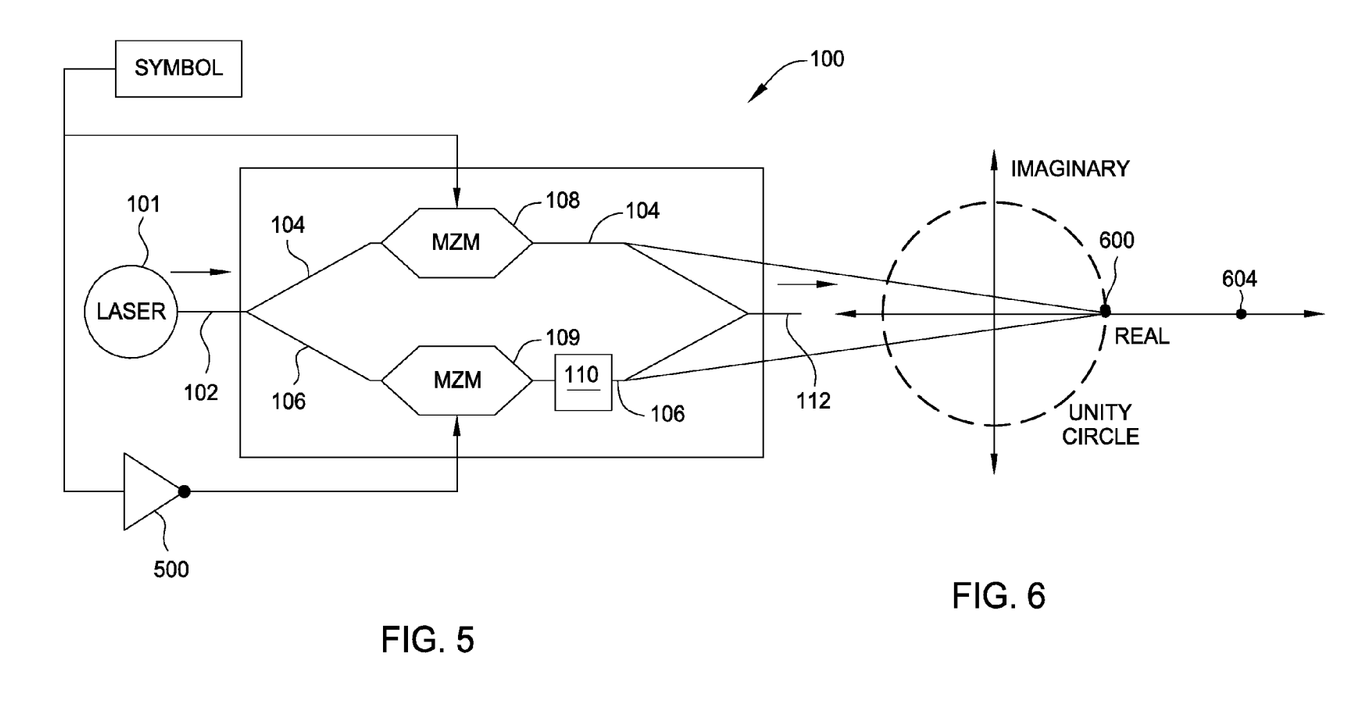
FIG. 5 illustrates a block diagram of an IQ modulator configured for low bit rate signaling, according to one embodiment disclosed herein.
FIG. 6 illustrates a constellation diagram of in-phase/quadrature data interference from the IQ modulator of FIG. 5, according to one embodiment disclosed herein.

FIG. 5 illustrates a block diagram of the IQ modulator 100 during a low bit rate signaling operation, where the phase shifter 110 is configured to phase shift at 180 degrees. The IQ modulator 100 additionally includes an inverter 500 configured to invert incoming electrical signals by inverting the data symbol. FIG. 6 illustrates a constellation diagram of in-phase/quadrature data interference from the IQ modulator of FIG. 5. Referring to FIGS. 5 and 6, in one embodiment, during a low bit rate signaling operation, in-phase data is applied to the in-phase MZM 108 and quadrature data is applied to the quadrature MZM 109. However, the quadrature data applied to the quadrature MZM 109 is first inverted by the inverter 500. That is, if a logical one is applied to MZM 108, then the inverter 500 applies a logical zero to MZM 109, and vice versa. In one embodiment, the data is inverted by software and/or firmware that controls the operation of the IQ modulator 100. In another embodiment, the inverter is hardware configured to invert the data. In-phase data is applied to the in-phase MZM 108 at the in-phase branch 104, resulting in point 600. Quadrature data is applied to the quadrature MZM 109 and the optical signal drives MZM 109 to apply a 180 degree phase shift at the quadrature branch 106. The phase shifter 110 applies a 180 degree phase shift to the inverted quadrature data at the quadrature branch 106, resulting again in point 600. Therefore, at the combined instantaneous optical output 112, the individual outputs at the in-phase branch 104 and the quadrature branch 106 constructively interfere to yield an output point 604. In more detail, the input of the in-phase MZM 108 is opposite of the data signal used to drive quadrature MZM 109. As a result, the output of quadrature MZM 109 is phase shifted 180 degree relative to the output of in-phase MZM 108. However, because of the 180 degree phase shift applied by the phase shifter 110, the optical signals of the in-phase branch 104 and quadrature branch 106 ultimately have the same phase. This relationship is shown in FIG. 6 where the outputs of the two branches 104, 106 correspond to the same point 600 in the constellation chart. When the respective signals in the branches combine, they constructively interfere to yield the combined instantaneous optical output 112 of the IQ modulator 100 that corresponds to point 604. Therefore, at the combined instantaneous optical output 112, the two signals at point 600 combine constructively to reflect a high power output. A resulting output symbol 604 indicates a constructive interference of the outputs of the branches 104 and 106 and reflects a high, or maximum, output power.

In another embodiment, it is contemplated that the phase shifter 110 in the IQ modulator 100 of FIG. 3 is configured to shift the phase of the optical signal outputted from the quadrature MZM 109 at the quadrature branch 106 by 0 degrees. Therefore, the optical signals of the in-phase branch 104 and quadrature branch 106 ultimately have the same phase, and result in a constructive interference of the outputs of the branches 104 and 106 to reflect a high, or maximum, output power. Similarly, the phase shifter 110 in the IQ modulator 100 of FIG. 5 is configured to shift the phase of the optical signal outputted from the quadrature MZM 109 at the quadrature branch 106 by 0 degrees. Therefore, the individual outputs at the in-phase branch 104 and the quadrature branch 106 destructively interfere to reflect a low output power.

Therefore, the low bit rate signaling shown in FIGS. 3-6 reflects either the instantaneous power of the output symbol 404 that either sits at a point of origin indicating low power output, or the instantaneous power of the output symbol 604 that reflects an interference of high amplitude, indicating a high power output generated from the signal.

Figure 7:
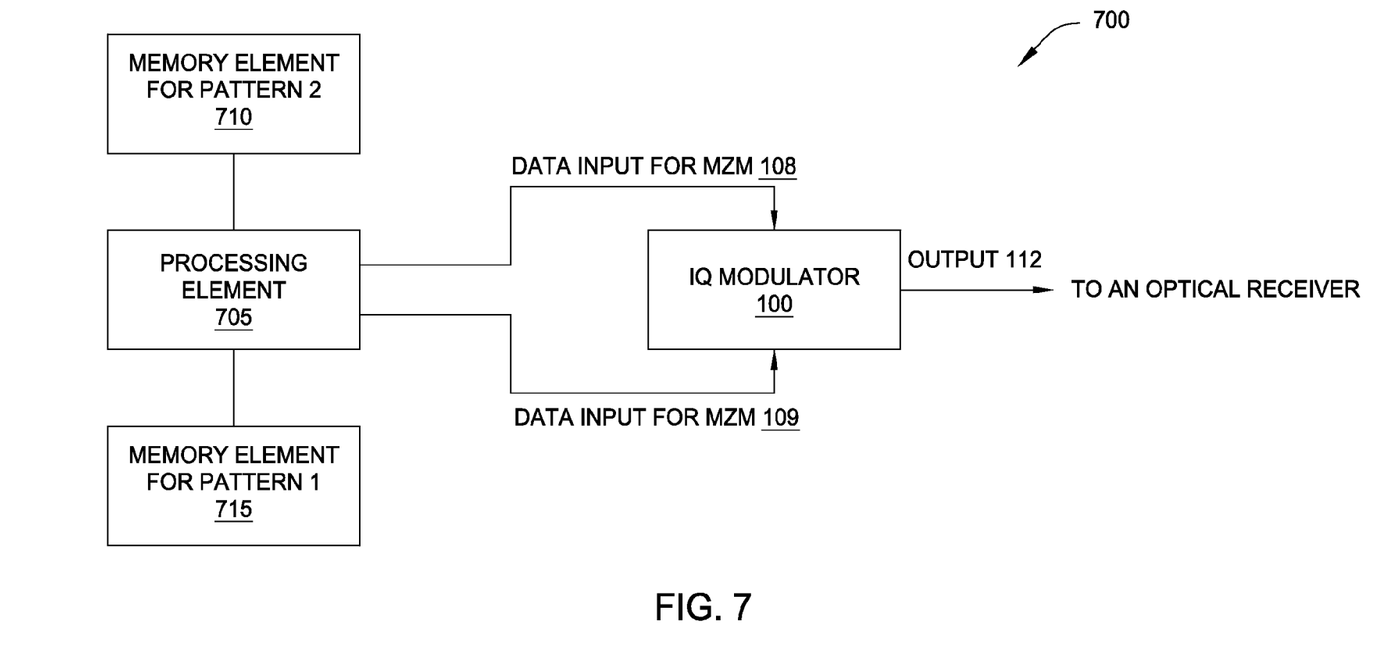
FIG. 7 illustrates a block diagram of a control system configured for low bit rate signaling, according to one embodiment disclosed herein.

FIG. 7 illustrates a control system 700 for transmitting a low bit rate signal to an optical receiver. Specifically, the control system 700 may use the two IQ modulator configurations discussed above in order to transmit information (i.e., a low bit rate signal) to an optical receiver. As shown, system 700 includes a processing element 705 and memory elements 710 and 715. The processing element 705 represents software, firmware and/or hardware (e.g., a processor or ASIC) that is capable of providing data inputs (i.e., symbols) to the MZMs 108, 109 in the IQ modulator 100. During normal operation, the processing element 705 may receive data (e.g., network packets) from a client computing device that the client wishes to transmit to the optical receiver. The processing element 705 may then decode the data into symbols which are then transmitted by the IQ modulator 100 to the optical receiver where the symbols are decoded into the original data. In contrast, when performing low bit rate signaling, the processing element 705 may use the data stored in the memory elements 710 and 715 for transmitting data to the optical receiver.

The memory elements 710 and 715 (e.g., RAM, Flash memory, EPROM, and the like) may contain predefined bit patterns (e.g., Pattern 1 and Pattern 2) which the processing element 705 then uses to drive the MZMs 108, 109 in the IQ modulator 100. In one embodiment, Patterns 1 and 2 may each contain a series of symbols (or bits) for each of the MZMs in the IQ modulator 100. Stated differently, each pattern includes two series of symbols—one associated with the in-phase MZM 108 and another associated with the quadrature MZM 109. Thus, although shown as a being contained in a single memory element, the Patterns 1 and 2 may each be associated with two memory elements—one that stores the symbols used to drive the in-phase MZM 108 and another for storing the symbols used to drive the quadrature MZM 109. Moreover, instead of storing Patterns 1 and 2 in memory elements, in an alternative embodiment, the processing element 705 may include logic for generating the Patterns 1 and 2—i.e., the predefined patterns are not stored in memory elements but rather dynamically generated using logic within the processing element 705.

Using the series of symbols in Patterns 1 and 2, processing element 705 may control the IQ modulator 100 to output the desired signal—e.g., a high power output or a low power output. For example, the processing element 705 may input a "1" to the in-phase MZM 108 and a "1" onto the quadrature MZM 109. As shown in FIGS. 3 and 4, if the same symbol is provided to both the MZMs, the resulting output signal 112 of the IQ modulator 100 is a low power output signal since the respective outputs of the branches 104, 106 destructively interfere. Notably, the output signal would also be low power signal if the processing element 705 provided a "0" to both the MZMs 108, 109. In contrast, if the processing element 705 provides a "1" as an input to the in-phase MZM 108 and a "0" as an input to the quadrature MZM 109 (or vice versa), the resulting signal is a high output power signal as shown in FIGS. 5 and 6 since the outputs of the branches constructively interfere when opposite symbols (or inverted symbols) are applied to the MZMs 108, 109.

In one embodiment, the processing element 705 may switch between the two patterns (Patterns 1 and 2) to transmit data to the optical receiver. For example, the optical receiver may measure the average power of the received signal for a specific time period. When the processing element 705 uses Pattern 1 to drive the IQ modulator 100, the average power of the output signal may be different than the average power when the processing element 705 uses Pattern 2 to drive the IQ modulator 100. The control system 700 may use the change in average power when switching between the patterns to convey data to the optical receiver.

The average output power of the IQ modulator 100 ($P_{out}$) for a given pattern is defined by the ratio of different symbols ($Samples_{different}$) relative to the number of different and equal ($Samples_{similar}$) symbols used when driving the MZMs:

$$P_{out} \approx \frac{Samples_{different}}{Samples_{different} + Samples_{similar}}$$

For example, assume that Pattern 1 instructs the processing element to provide the symbol sequence of 111 to the in-phase MZM 108 and the symbol sequence 100 to the quadrature MZM 109. The average output power would be:

$$P_{out} \approx \frac{Samples_{different} = 2}{Samples_{different} = 2 + Samples_{similar} = 1} \approx$$

2/3 the maximum output power

Thus, when the processing element 705 is using Pattern 1 to drive the IQ modulator 100, the average power during this time is ⅔ the maximum output power of the modulator 100. In contrast, Pattern 2 may drive respective symbol sequences to the MZMs that result in a different average output power (e.g., ⅓ the maximum output power of the IQ modulator 100). The optical receiver, which may sample at a much lower rate due to hardware limitations, can be configured to detect the average output power (rather than the instantaneous output power of each symbol in the patterns). Advantageously, the pattern length may be adjusted to provide any desired average power for a given time period. For example, a longer pattern length provides greater granular control of the average power output. Additionally, a pattern may be repetitive such that, during a defined time period, the average power output is constant.

Advantageously, using the patterns to provide an average power means that data can be conveyed to the receiver which may sample at a much slower sample rate than when performing normal operations. That is, the IQ modulator 100, which may be transmitting the signals at high rate, may still convey data to an optical receiver that is detecting data at a lower rate. For example, if the optical receiver detects an average power value corresponding to Pattern 1, it translates this information into a logical "0". In contrast, if the optical receiver detects an average power value corresponding to Pattern 2, it may translate this information into a logical "1". Although only two patterns are discussed, a low bit rate signal may instead use multiple patterns and thus convey more complex information (e.g., multiple bits) to the receiver during each sample.

Figure 8:
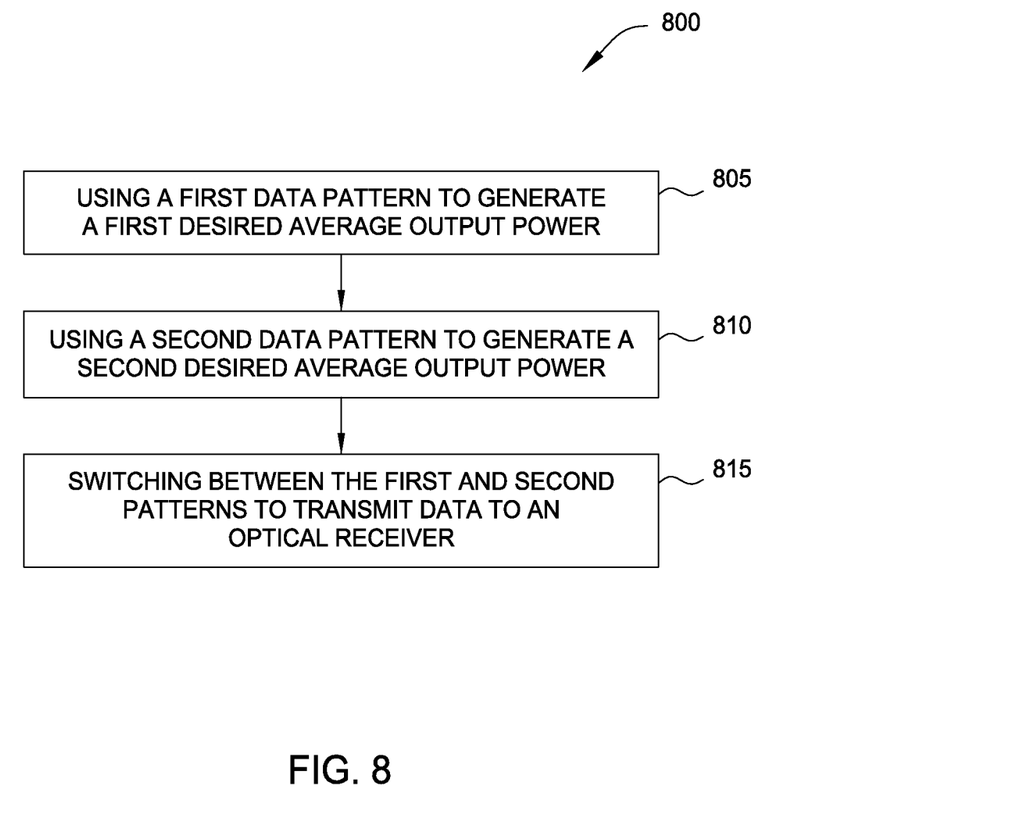
FIG. 8 illustrates a method of using the system shown in FIG. 7 to transmit data to an optical receiver, according to one embodiment described herein.

FIG. 8 illustrates a method 800 of using the system 700 shown in FIG. 7 to transmit data to the optical receiver, according to one embodiment described herein. At block 805, the processing element may drive the respective MZMs 108, 109 of the IQ modulator 100 based on a first pattern. As discussed above, the pattern causes the instantaneous optical power output of the modulator to vary from a low power output to a high power output as the two branches either constructively or destructively interfere. The processing element may drive the IQ modulator 100 using the first pattern for a predetermined period of time (e.g., a sample period) during which time the instantaneous power output is averaged to yield a first desired average output power. Stated differently, the first pattern may be designed to yield the first desired average output power for the sample period.

At block 810, the processing element may drive the respective MZMs 108, 109 of the IQ modulator 100 based on a second pattern. Like the first pattern, the second pattern causes the optical power in the two branches of the IQ modulator 100 to either constructively or destructively interfere to yield the instantaneous high and low optical power outputs shown in FIGS. 4 and 6 above. However, the ratio of instantaneous high power output and low power outputs may vary between the first and second patterns. As such, the average power output of the IQ modulator 100 when driven using the first pattern will be different than the average power output when the modulator is driven by the second pattern. For instance, over a single sample period, the first pattern may result in an average output power of the IQ modulator 100 that is higher (or lower) than the average output power generated by the second pattern.

At block 815, the processing element switches between the first and second patterns to transmit data to an optical receiver. Specifically, the processing element may determine whether to switch between the two patterns after each sampling period. Based on the average output power received during a sample period, the optical receiver may determine a corresponding data or logical bit.

Figure 9:
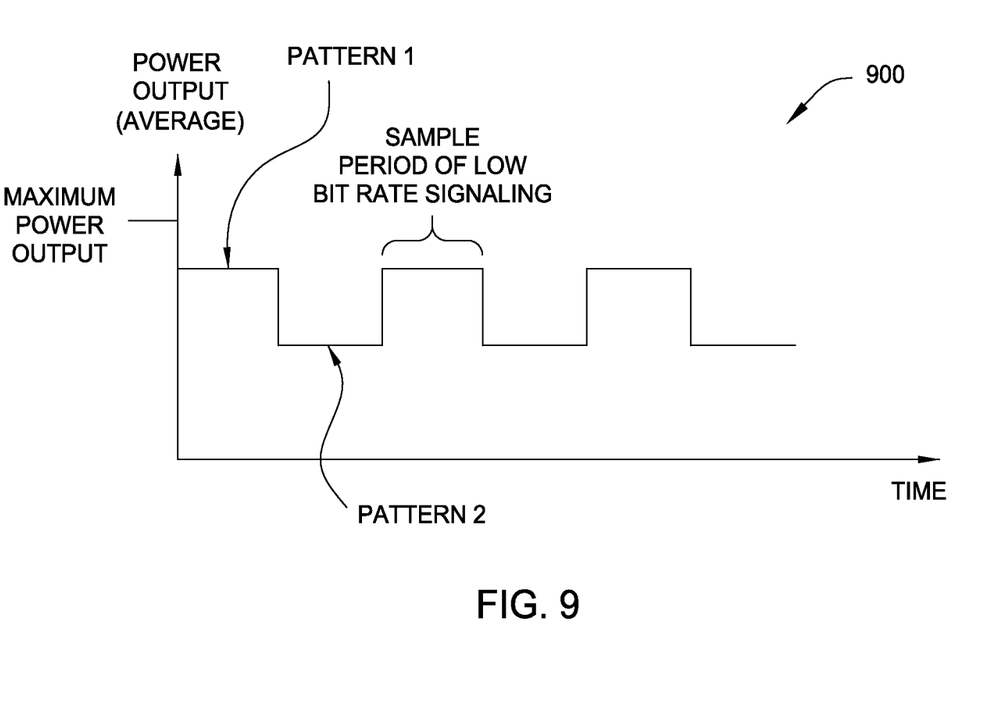
FIG. 9 illustrates a graphical representation of power output levels as a function of time, according to one embodiment disclosed herein.

FIG. 9 illustrates a graphical representation 900 of power output levels as a function of time. Specifically, graph 900 illustrates the average output power resulting from switching between the two patterns shown in FIG. 7. Stated differently, graph 900 does not show the instantaneous power transitions from the maximum to the minimum power output of the IQ modulator 100 when applying the symbol sequences of each pattern to the MZMs 108, 109 but rather the average power resulting from the instantaneous power transitions for the time period the pattern is followed by the processing element 705 in FIG. 7. In one embodiment, the optical receiver may only measure the average power and not the instantaneous power received from the IQ modulator 100. Accordingly, the processing element may switch between the patterns (i.e., cause the IQ modulator 100 to output varying average powers) during the sample time in order to convey information (e.g., logic bits) to the receiver. Advantageously, during installation of new transmitters, the granular control of the average output power resulting switching between the patterns, prevents existing signals from being disturbed during the installation. For example, submitting only a low output power, e.g., 1 to 10 microwatts, prevents disturbance of the existing signals to the receiver if the new transmitter is erroneously operating on the same wavelength.

Although graph 900 illustrates transitioning between Pattern 1 and Pattern 2 during each sample size, of course, the processing element may maintain a pattern over multiple sample periods to convey the same logical bit to the receiver. That is, the processing element includes logic for switching between the patterns in order to convey low bit rate signaling data (e.g., a string of logical bits) to the optical receiver. Assuming Pattern 1 corresponds to a logical 1 and Pattern 2 corresponds to a logical 0, graph 900 conveys the data string "101010" to the optical receiver. To convey, for example, the data string "111000" to the optical receiver, the processing element may drive the IQ modulator 100 using Pattern 1 for the first three sample periods but drive the modulator 100 using Pattern 2 for the next three sample periods.

Based on the low bit rate signaling data, the optical receiver may identify an optical port to which a transmitter is connected by decoding the average optical output power signal 112.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Conclusion

The above low bit rate signaling operation in optical systems allows for a quick and cost effective method to control the average output level of a signal: (i) without disabling/modulating the laser source; (ii) without disabling the data signals; (iii) while keeping the modulator bias control loops in operation; and (iv) requiring no additional hardware, only configuration of existing software. Additionally, the low bit rate signaling also disables the optical output: (i) without disabling the laser source; (ii) without disabling the data signals; and (iii) while keeping the modulator bias control loops in operation.

The flowchart and block diagrams in the Figures illustrate the architecture, functionality and operation of possible implementations of systems and methods according to various embodiments.

In view of the foregoing, the scope of the present disclosure is determined by the claims that follow.

I claim:

1. A method comprising:
  receiving an optical input signal to be modulated by an IQ modulator comprising a first modulator and a second modulator;
  applying data to the first and second modulators during a first operation; and
  applying a first pattern of data to the first modulator and applying a second pattern of data to the second modulator during a second operation, wherein the second operation results in an optical output signal of the IQ modulator having a low power output and a high power output, and wherein the first and second patterns of data are defined to provide respective desired average powers for a predefined time period based on the low and high power outputs.

2. The method of claim 1, wherein the first and second patterns of the second operation result in a 0 degree phase shift or a 180 degree phase shift to the input signal at the first and second modulators.

3. The method of claim 1, wherein the first and second modulators are nested Mach-Zehnder modulators, and wherein the first modulator comprises an in-phase branch and the second modulator comprises a quadrature branch.

4. The method of claim 3, wherein the respective desired average powers of the optical output signal represent encoded data, wherein the optical output signal is generated by a series of the first and second patterns.

5. The method of claim 4, wherein the second operation results in a 180 degree phase shift to the input signal at the in-phase branch of the first modulator, and the second operation drives a first 180 degree phase shift to the input signal at the quadrature branch of the second modulator, wherein the quadrature branch comprises a phase shifter that applies a second 180 degree phase shift to the input signal at the quadrature branch.

6. The method of claim 5, wherein the output signal is the low power output.

7. The method of claim 5, wherein the second operation results in a 180 degree phase shift to the input signal at the in-phase branch of the first modulator, and the second operation drives a 0 degree phase shift to the input signal at the quadrature branch of the second modulator, wherein the quadrature branch comprises a phase shifter that applies a 180 degree phase shift to the input signal at the quadrature branch.

8. The method of claim 4, wherein the output signal is the high power output.

9. The method of claim 4, wherein the input signal at the second modulator is selectively inverted by software configured to control the operation of the IQ modulator or by hardware configured to invert data.

10. The method of claim 4, wherein a length of the first pattern of data and a length of the second pattern of data is configured to be adjusted to control the desired average powers.

11. The method of claim 4, wherein the second operation results in a 0 degree phase shift to the input signal at the in-phase branch of the first modulator, and the second operation drives a 0 degree phase shift to the input signal at the quadrature branch of the second modulator, wherein the quadrature branch comprises a phase shifter that applies a 0 degree phase shift to the input signal at the quadrature branch, thereby generating the high power output of the output signal.

12. An optical modulation system comprising:
a first modulator in a first optical path;
a second modulator in a second optical path, wherein an optical input signal is divided between the first and second optical path; and
a processing element configured to:
apply data to the first and second modulators during a first operation;
apply a first pattern of data to the first modulator and apply a second pattern of data to the second modulator during a second operation, wherein the second operation results in an optical output signal of the of the optical modulation system having a low power output and a high power output, and wherein the first and second patterns of data are defined to provide respective desired average powers for a predefined time period based on the low and high power outputs.

13. The optical modulation system of claim 12, wherein the first and second modulators are nested Mach-Zehnder modulators, and wherein outputs of the first optical path and the second optical path merge to yield the optical output signal.

14. The optical modulation system of claim 12, wherein the respective desired average powers of the optical output signal represent encoded data, wherein the optical output signal is generated by a series of the first and second patterns.

15. The optical modulation system of claim 12, wherein a length of the first pattern of data and a length of the second pattern of data is configured to be adjusted to control the respective desired average powers.

16. A method comprising:
identifying a transmitter in an optical system by low bit rate signaling, wherein the low bit rate signaling comprises:
receiving an optical input signal from an optical source; and
transmitting identification data of the transmitter encoded in one or more averages of low and high power values generated by an on-off keying sequence outputted from an optical IQ modulator.

17. The method of claim 16, wherein power to the optical source is not reduced or turned off.

18. The method of claim 16, wherein generating an on-off keying sequence comprises:
applying data from the input signal to a first and second modulator Mach-Zehnder modulator during a first operation;
applying a first pattern of data to the first modulator and a second pattern of data to the second modulator during a second operation, wherein the second operation results in an output signal having the low power output and the high power output; and
averaging the low and high power outputs.

19. The method of claim 18, wherein the first pattern of data applies a 0 or 180 degree phase shift to the input signal at the first modulator, and the second pattern of data applies a 0 or 180 degree phase shift to the input signal at the second modulator.

20. The method of claim 19, wherein the second pattern of data selectively inverts the input signal prior to applying a phase shift to the input signal at the second modulator.

* * * * *

UNITED STATES PATENT AND TRADEMARK OFFICE
CERTIFICATE OF CORRECTION

| | |
|---|---|
| PATENT NO. | : 9,712,247 B2 |
| APPLICATION NO. | : 14/084746 |
| DATED | : July 18, 2017 |
| INVENTOR(S) | : Thomas Duthel |

It is certified that error appears in the above-identified patent and that said Letters Patent is hereby corrected as shown below:

On the Title Page

In item (57), in Column 2, in "Abstract", Line 12, delete "indentifying" and insert -- identifying --, therefor.

In the Specification

In Column 2, Line 30, after "signal" delete "of the of the" and insert -- of the --, therefor.

In Column 2, Line 36, delete "indentifying" and insert -- identifying --, therefor.

In the Claims

In Column 11, Lines 37-38, in Claim 12, after "signal" delete "of the of the" and insert -- of the --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*